(12) United States Patent
Ferris et al.

(10) Patent No.: US 6,229,287 B1
(45) Date of Patent: May 8, 2001

(54) BATTERY CHARGER

(76) Inventors: Michael T. Ferris, 7709 Cove Ridge Rd., Hixson, TN (US) 37343; Zdenek Buchar, 903 Belvoir Hills Cir., Chattanooga, TN (US) 37412

( * ) Notice: Subject to any disclaimer, the term of this patent is extended or adjusted under 35 U.S.C. 154(b) by 0 days.

(21) Appl. No.: 09/490,441

(22) Filed: Jan. 24, 2000

(51) Int. Cl.[7] .................................................. H02J 7/04
(52) U.S. Cl. .................................... 320/141; 320/139
(58) Field of Search .................................. 320/141, 139, 320/145, 129

(56) References Cited

U.S. PATENT DOCUMENTS 5,264,777 * 11/1993 Smead ................................. 320/126
5,617,007 * 4/1997 Keidl et al. ......................... 320/141
5,905,364 * 5/1999 Ookita ................................. 320/141

* cited by examiner

Primary Examiner—Peter S. Wong
Assistant Examiner—Lawrence Luk

(57) ABSTRACT

A battery charger is described for one or more rechargeable batteries. The charger derives its power from a DC power source such as another battery, and produces a pulsed recharging current that has a periodic variable frequency pulse. The charger also permits higher voltage charging current to be achieved than the initial voltage of the DC power source, and monitors both the power source and the batteries being recharged to avoid depletion of the power source or over charging of the batteries.

2 Claims, 4 Drawing Sheets

BATTERY CHARGER

BACKGROUND OF THE INVENTION

The present invention is directed to a battery charger of one or more chargeable batteries. More particularly, the present invention is directed to a system and device for charging a plurality of batteries in which both the input voltage from a power source and the level of charge provided to the charging batteries can be monitored and the system shut down when pre-set charge levels are reached. The present invention further includes a device that provides a charging current having a periodic pulsed variable frequency component that maintains the condition of the charged battery plates thereby extending the life of the battery.

Increasingly, batteries are being employed in a wide variety of applications as a source of electrical energy. Along with the increasing use of batteries, recharging of those batteries as they become depleted has become also increasingly prevalent. Frequently, the recharging of depleted batteries involves use of a current source such as an electric outlet. In some instances, however, it is more convenient, if not necessary, to recharge the batteries from another battery that provides the required energy source. Typical of these situations are boats and mobile homes which may have multiple batteries for various appliances and equipment in addition to the main battery that is used to start the vehicles engines. Clearly, in such instances, it is critically important that the charging of the secondary batteries from the main battery be in a controlled manner that both provides an adequate charge to the secondary batteries and does not deplete the primary battery so that it can no longer perform vital function of starting the vehicle's engine.

There is, therefore, the need for a battery charging system which monitors the level of charge applied to secondary batteries as well as the level of charge of remaining in the main battery from which the charging current is drawn and shuts down the system if either of these levels is passed. There is a further need for a battery charging system that is capable of charging multiple batteries either in series or in separate circuits without a drop in voltage. Still a further need is for a battery charging system having the aforementioned features which is capable of extending the life of the batteries being recharged especially wet cells such as lead acid batteries which have plates.

SUMMARY OF THE INVENTION

Accordingly, the present invention is directed to a device and system that achieves the aforementioned objectives and substantially obviates one or more of the problems that have arisen due to limitations and disadvantages of the related art.

Additional features and advantages of the invention will be set forth in the description which follows and in part will be apparent from the description or may be learned by the practice of the invention. The objectives and other advantages of the invention will be realized and attained by the system of the invention as particularly pointed out in the written description and claims hereof as well as the appended drawings.

To achieve these and other advantages and in accordance with the purposes of the invention as embodied and broadly described, the present invention is, in one embodiment, a battery charger for charging one or more chargeable batteries comprising a current controller connected between a DC power source and one or more chargeable batteries. The current controller comprises a current mode control for converting the DC current received from the DC power source to a higher voltage, a means for providing a variable voltage control signal to a pulse width modulator for producing a variable frequency range from the higher voltage DC current, and a timer for controlling a switch for producing periodic pulses of the DC current having the variable frequency range. An isolator is provided for receiving the DC current that includes the periodic pulses of variable frequency current from the current control and directing the received DC current into a plurality of outputs to the chargeable batteries. The current mode controller can include means for converting the DC charging current into AC charging current having higher AC voltage and means for rectifying the AC current back to DC current at the higher voltage. Monitors are also provided in accordance with the invention for monitoring the DC charging current from the DC power source and shutting down the system if the voltage of the DC power source falls below a pre-set level. Means are further provided in the system of the invention for shutting down the charger when the chargeable batteries are charged to a pre-set level.

In a preferred embodiment of the invention, the variable frequency range of the pulses of DC current is about 20 to about 100 KHz. In a further embodiment of the invention, the periodic pulses of DC current having the variable frequency range are of a duration of about 0.5 seconds of every 6 seconds.

It is to understood that both the foregoing general description and the following detailed description are exemplary and explanatory and are intended to provide further explanation of the invention as claimed.

The accompanying drawings are included to provide a further understanding of the invention and are incorporated in and constitute a part of this specification and together with the description serve to explain the principals of the invention. Conventionally understood symbols have been used in the drawings to depict electronic components.

DETAILED DESCRIPTION OF THE INVENTION

Figure 1:
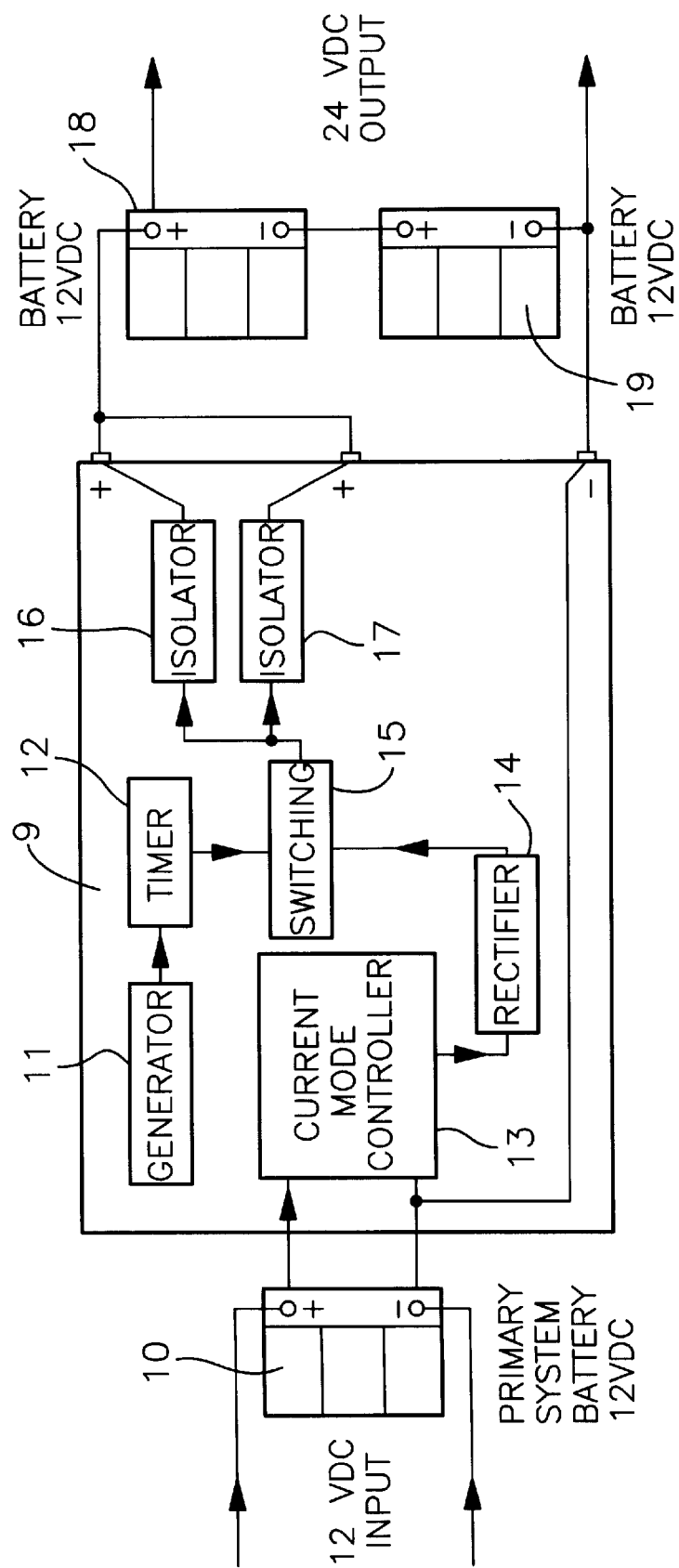
FIG. 1 is a block diagram illustrating the components of the invention arranged according to one embodiment thereof.
Figure 2:
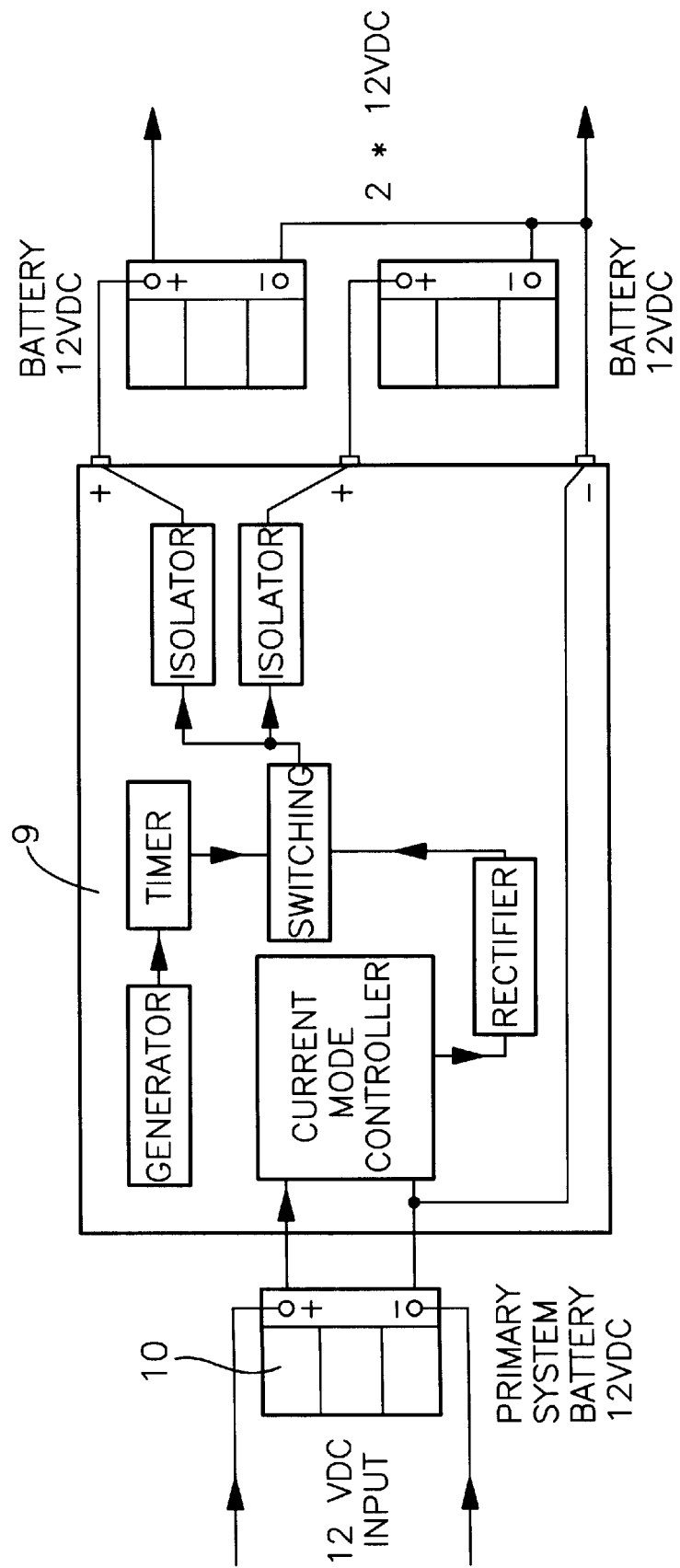
FIG. 2 is a block diagram illustrating the components of the invention arranged according to a second embodiment thereof.

In accordance with the present invention, a battery charger for charging a plurality of chargeable batteries is illustrated generally in FIGS. 1 and 2 of the drawings which respectably illustrate two modes for connecting the charger of the invention with the batteries being charged. In both instances, battery charger 9 is shown connected to a 12 volt primary battery system on the input side and a pair of 12 volt batteries on the output side. In the case of FIG. 1, the total output from the two 12 volt batteries is 24 volts DC; while in FIG. 2, the two batteries are isolated from each other through chargers/isolator to produce two independent 12 volt DC circuits. Primary DC power source 10 provides energy to current mode controller 13 which converts the 12 volt DC current to AC current having high AC voltage spike. The DC component of the higher voltage AC current is removed by rectifier 14 before going to switch 15. A variable voltage control signal is provided by generator 11 and timer 21 to switch 15 also to produce periodic pulses of DC current having variable frequency. Isolators 16 and 17 received the DC current having periodic pulses of variable frequency current from the switch 15 directed to outputs that are connected to the batteries 18 and 19 being charged.

Figure 3:
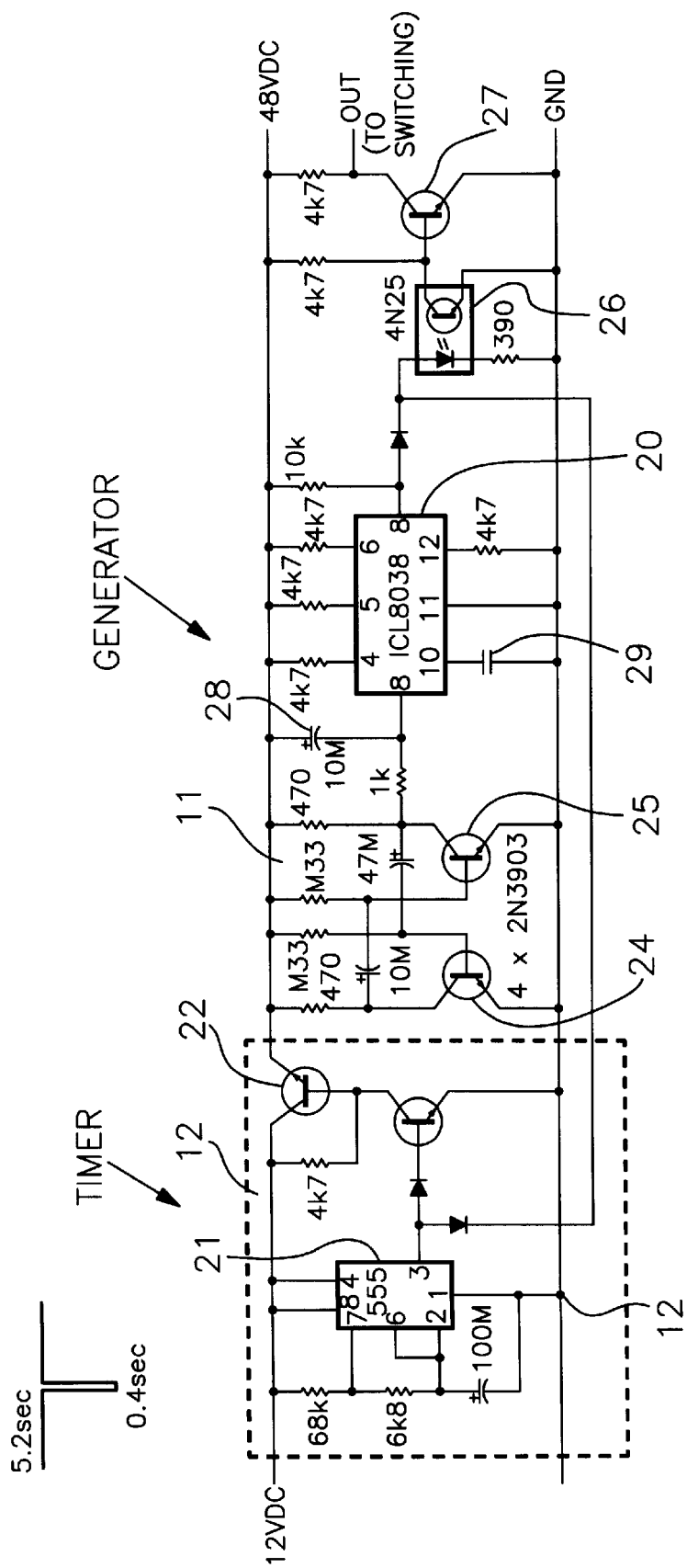
FIG. 3 is a schematic diagram showing in detail the timer and generator components of the invention.

FIG. 3 illustrates schematically generator 11 and timer 21, which are employed in accordance with the invention to provide a variable voltage control signal to pulse width modulator 20 which, for example, can be a precision wave form generator/voltage control oscillator such as sold by Radio Shack, a division of Tandy Corporation of Fort Worth, Tex. as the ICL803 8 wave form generator. Timer 21 is a monolithic timing circuit having a highly stable controller capable of producing accurate time delays or oscillation and, for example, is available from Phillips Semiconductors Linear Products under the designation SE555 or SE555C. Details of pulse width modulation are also found in U.S. Pat. No. 5,198,743 to McClure et al., U.S. Pat. No. 5,204,611 to Nor et al., and U.S. Pat. No. 5,764,030 to Gazo, all of which are incorporated in their entirety herein by reference.

Timer 21 generates on its output 5.5 second long pulses with 0.5 long gaps. During the pulse, the control signal will do two things. First, it opens transistor 23 through diode 5, which in turn grounds the base of transistor 22 which will close, cutting off power to the generator. Second, it bypasses all the generator's circuitry through diode and directly controls the LED in optocoupler 26. The LED inside the OPTO goes on in 5.5 second flash. The photo transistor in the OPTO receives this flash and opens, which will ground base of transistor 27 for 5.5 seconds. Transistor 27 closes for the same time (it is normally open through resistor 54) and voltage on its collector goes up through resistor 55, opening transistors. The charger is delivering full uninterrupted charge. When the Timer does not generate 5.5 second pulse, there is 0.5 second gap. Nothing goes through diodes 4 and 5. Therefore transistor 23 closes and transistor 22 opens. Now the generator has power and starts to generate. First a stable multi-vibrator with RC (resistor 48 and capacitor 64) circuit produces a saw-like signal. This signal goes to function generator 20 and the generator produces on its output square pulses (spectrum frequencies) which power through diode 6, the LED inside the OPTO. This device is able to work with frequencies up to hundreds megahertz. The highest frequency coming from the generator is approximately 100 KHz. Therefore the spectrum is transfer through the OPTO. The base of transistor 27 and output from its collector and resistor 55 is for 5.5 second solid voltage for full charging and 0.5 second pulses for conditioning battery plates.

Table 1 summarizes the components illustrated in FIG. 3:

TABLE 1

Components of FIG. 3 and Function

| TIMER | | | |
|---|---|---|---|
| Resistor | 41 | 68K | through internal circuit to IC1 to determine timing |
| Resistor | 42 | 6 K8 | through internal circuit to IC1 to determine timing |
| Resistor | 43 | 4 K7 | closes Q1 during 5.5 second |

TABLE 1-continued

Components of FIG. 3 and Function

| Capacitor | 61 | 100 MF | through internal circuit in IC1 to determine timing |
|---|---|---|---|
| Diode | 4 | | isolate IO1 from IO2 |
| Diode 2 | 5 | | isolate base Q2 from direct output IO1 |
| Transistor | 22 | 2N3903 | open = power ON for IO2 + saw generator (0.5 second) |
| Transistor | 23 | 2N3903 | opening and closing Q1, controlled by IO1 |
| Timer | 21 | NE555 | timing function generator IO2 + saw generator |
| GENERATOR | | | |
| Transistor | 24 | 2N3903 | active component of saw generator. |
| Transistor | 25 | 2N3903 | active component of saw generator |
| Capacitor | 62 | 10 MF | determine frequency of saw generator |
| Capacitor | 63 | 47 MF | determine frequency of saw generator |
| Resistor | 44 | 470 | determine frequency of saw generator |
| Resistor | 45 | M33 | base Q3 set point |
| Resistor | 46 | M33 | base Q4 set point |
| Resistor | 47 | 470 | determine frequency of saw generator |
| Resistor | 48 | 1 K | part of RC circuit, convert square pulse to saw pulse |
| Capacitor | 64 | 10 MF | part of RC circuit, convert square pulse to saw pulse. This capacitor is charged through R8 discharged through input IO2, therefore the voltage is wobbling. |
| Resistor | 49 | 4 K7 | determine working set point of the generator |
| Resistor | 50 | 4 K7 | determine working set point of the generator |
| Resistor | 51 | 4 K7 | determine working set point of the generator |
| Resistor | 52 | 10K | determine working set point of the generator |
| Capacitor | 65 | 4.7 nF | determine working set point of the generator |
| F. Generator | 20 | 1CL8038 | voltage at input 8 control pulse width at output 9 |
| Diode | 6 | | isolate IO2 from IO1 |
| Optocoupler | 26 | 4N25 | isolate timer and generator from higher voltage at switching circuit (up to 48 VDC) |
| Resistor | 53 | 820 | limit current for LED inside OPTO |
| Resistor | 54 | 4 K7 | determine working set point of Q5 (inverter) |
| Resistor | 55 | 4 K7 | determine working set point of Q5 (inverter) |
| Transistor | 27 | 2N2903 | direct control of switching transistors |

Figure 4:
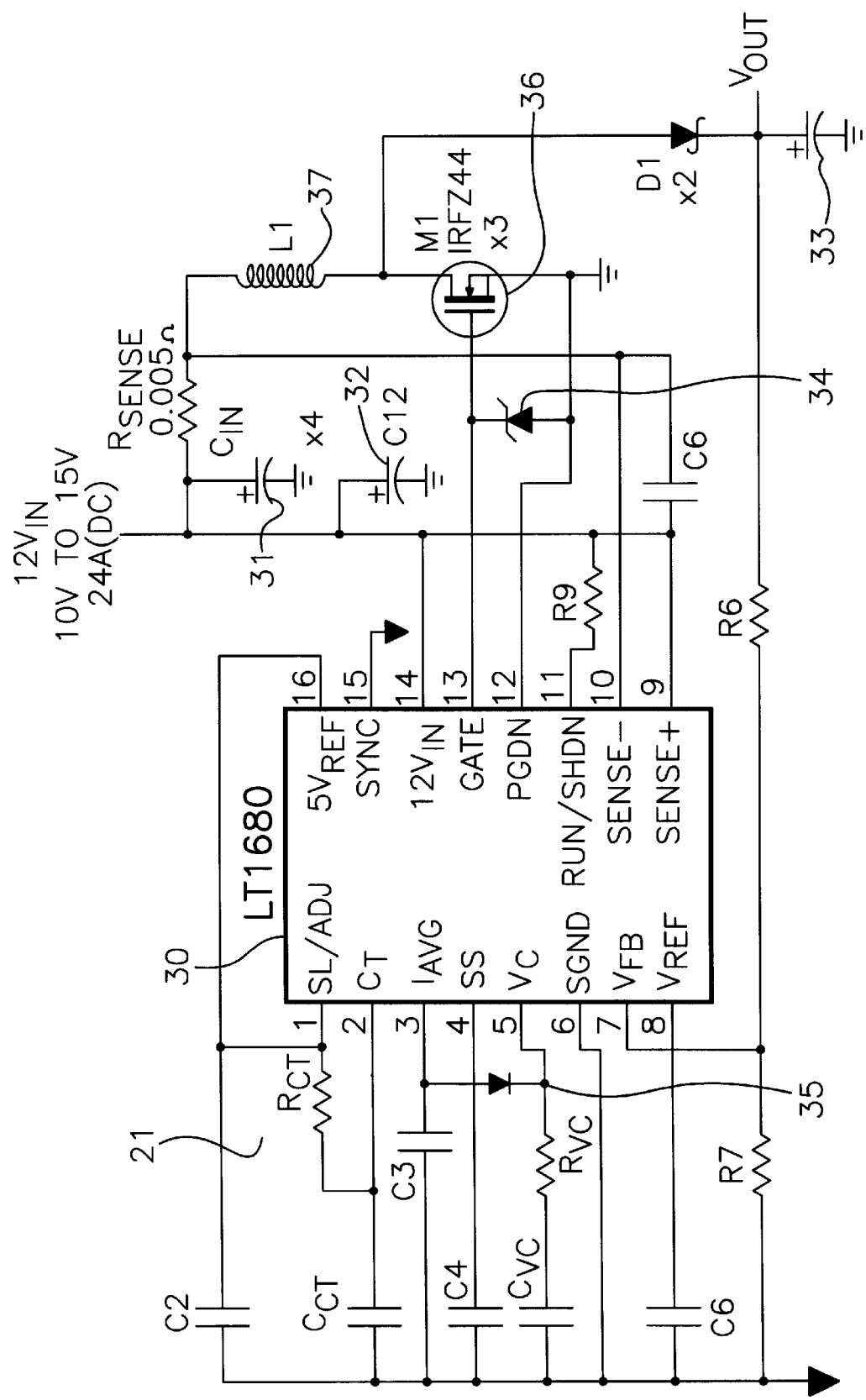
FIG. 4 is a schematic illustration of the current mode controller of the invention.

FIG. 4 is a schematic illustration of the current mode controller 13, in which 30 is a switching power supply controller.

The current mode controller generates on its output high frequency pulses which are directly fed to transistor gate 36. This device is a transistor type MOSFET, which has very high gate impedance and ability to conduct and switch high current. This ability makes this device an ideal switching component of high frequencies. This transistor shorts coil 37 against the ground at a frequency of approximately 200 KHz. Current going through the coil every cycle (cycle= ON=OFF) produces high voltage spikes also at very high frequency. Small percentage of this pulses contains a negative level which is removed by diode 35. Remaining positive current is than filtrated by capacitor 33 and the output is clean DC at a level which is set by value of resistors 64 and 63 in the incoming power line.

During the charging operation, the battery charger of the present invention provides a charging current that includes periodic pulses of DC current of about 0.5 seconds duration every 6 seconds. These periodic pulses sweep a variable frequency range of about 20 to 100 KHz. This periodic pulse of variable frequency current has been found, in accordance with present invention, to maintain the plates of the batteries being charged thereby extending the useful life of these batteries.

A further feature of the present invention is the provision of monitoring means for monitoring both the level of current in the primary battery providing energy to the system and the level of current in the batteries being charged with provision for shutting down the system if the level of current in the primary battery system falls below a specified level and when the desired level of charging is achieved in the batteries being charged. Systems for monitoring charge level are known in the art and described, for example, in the aforementioned U.S. patents incorporated herein by reference.

TABLE II summarizes the components illustrated in FIG. 4:

STEP UP CIRCUIT

| | | |
|---|---|---|
| Resistor | 61 | determine timing of internal oscillator |
| Resistor | 62 | compensation for optimal transient response |
| Resistor | 63 | determine charging level (output voltage) |
| Resistor | 64 | determine charging level (output voltage) |
| Resistor | 65 | set point primary power level for shutting charger down |
| Resistor | 66 | current sensing resistor |
| Capacitor | 72 | slope compensation |
| Capacitor | 71 | determine timing of internal oscillator |
| Capacitor | 73 | average current limit integration |
| Capacitor | 74 | determine soft start (ramping) |
| Capacitor | 70 | compensation for optimal transient response |
| Capacitor | 76 | voltage reference decoupling |
| Capacitor | #31 | supply immediate demand, filtration |
| Capacitor | 734 | stabilizing current limit integration |
| Capacitor | #33 | filtration at the output |
| Capacitor | 734 | stabilizing current limit integration |
| Diode | D1 #35 | protection during outbreak short circuits |
| Diode | D2 #34 | protection against super high spikes at the output |
| Diode | D3 #33 | rectifying actual charging current AC to DC |
| Transistor | M1 #36 | it is developing together with L1 higher AC voltage |
| Coil | L1 #37 | it is developing together with M1 higher AC voltage |
| CMC | LT 1680 | switching power supply controller |

While the present invention has been described with respect to a 12 volt DC charging system, it will be apparent that other voltage levels could as well be employed and that the present invention permits either multiple batteries to be charged at the indicated voltage level or for the voltage to be increased by multiples of 2, 3 and 4 times. The present invention has numerous applications involving the use of batteries for electric power including electric fishing trolling motors, recreational vehicles, boats and portable appliances. The system of the present invention allows for a full charge of a battery system but does not overcharge the system and provides also for "on demand" charging as required by the batteries. A particularly significant feature of the present invention is that the main battery used as the energy source for charging is protected so that sufficient power remains in it to be available for its primary function such as starting an engine. The invention also has the advantage of remaining operative in a "stand by" mode when all chargeable batteries have reached the desired full charged level.

It will be apparent to those skilled in the art that various modifications and variations can be made in the charger of the present invention without departing from the spirit or scope of the invention. Thus, it is intended that the present invention cover the modifications and variations of this invention provided they come within the scope of appended claims and there equivalent.

What is claimed:

1. A battery charger for charging one or more chargeable batteries, said charger comprising:

a DC power source;

a current control means connected between the DC power source and said one or more chargeable batteries; the current control means comprising:

a current mode control means for generating DC current at higher voltage than the voltage provided by said DC power source;

the said current mode control means including means for converting said DC charging current to AC, means for producing higher voltage AC current spikes and means for rectifying said AC current back to DC current at said higher voltage;

means for providing a variable voltage control signal to a pulse width modulator for producing a variable frequency range from said higher voltage DC current;

timer means for controlling a switch for producing periodic pulses of said DC current having said variable frequency range;

isolator means for receiving said DC current including periodic pulses of variable frequency current from said current control means and directing said received DC current into a plurality of outputs to said chargeable batteries.

2. The battery charger of claim 1 wherein said AC current is between 100 and 300 KHz.

* * * * *